United States Patent [19]

Sumi

[11] Patent Number: 4,605,286
[45] Date of Patent: Aug. 12, 1986

[54] MOTOR BUILT-IN LENS MOUNTING

[75] Inventor: Akiyasu Sumi, Kanagawa, Japan

[73] Assignee: Canon Kabushiki Kaisha, Tokyo, Japan

[21] Appl. No.: 611,413

[22] Filed: May 17, 1984

[30] Foreign Application Priority Data

| May 20, 1983 [JP] | Japan | 58-89781 |
| May 20, 1983 [JP] | Japan | 58-89782 |
| May 20, 1983 [JP] | Japan | 58-89783 |

[51] Int. Cl.⁴ .............................................. G02B 7/04
[52] U.S. Cl. ................................... 350/429; 350/255
[58] Field of Search ......................... 350/255, 269, 429

[56] References Cited

U.S. PATENT DOCUMENTS

| 3,090,282 | 5/1963 | Angenieux | 350/429 |
| 3,163,701 | 12/1964 | Staubach | 350/255 |
| 3,687,042 | 8/1972 | Mizui et al. | |
| 3,917,394 | 11/1975 | Sturdevant | 350/255 |
| 4,083,057 | 4/1978 | Quinn | 350/429 |
| 4,113,359 | 9/1978 | Koike et al. | |
| 4,152,060 | 5/1979 | Specht | |
| 4,378,146 | 3/1983 | Suzuki et al. | 350/269 |
| 4,482,986 | 11/1984 | Noda et al. | 350/255 |
| 4,482,998 | 11/1984 | Tsurushima et al. | 350/255 |
| 4,491,401 | 1/1985 | Inaba et al. | 350/269 |

FOREIGN PATENT DOCUMENTS 57-147132 11/1981 Japan .
57-186738 11/1982 Japan .

*Primary Examiner*—John K. Corbin
*Assistant Examiner*—Loha Ben
*Attorney, Agent, or Firm*—Toren, McGeady, Stanger, Goldberg & Kiel

[57] ABSTRACT

A mechanical mounting for a lens system having a component axially movable to perform optical functions. Movement of the component is controlled by a motor in a form of a hollow cylindrical field magnet rotatably fitted in a hollow cylindrical field coil which is fixedly fitted on a body tube of the lens mounting. Thus, the motor is snugly assembled with members of the lens mounting.

9 Claims, 9 Drawing Figures

MOTOR BUILT-IN LENS MOUNTING

BACKGROUND OF THE INVENTION

1. Field of the Invention

This invention relates to lens mountings having incorporated therein a motor by which movement of a movable lens system is controlled.

2. Description of the Prior Art

There have been known many techniques of employing the reactive force of electromagnetic induction for moving some members or units within the lens mounting. As examples of prior art relating to the technique of controlling the operation of a diaphragm unit in the lens mounting by an electromagnetic induction mechanism, mention may be made of U.S. Pat. Nos. 3,687,042 and 4,113,359.

Further, in relation to a motorized focusing technique it has been the common practice in the art of motion picture cameras to incorporate a small-sized D.C. motor in the lens mounting with the driving torque of said motor being transmitted through a gear train to the holder for the focusing lens. The use of such a motor driven focusing mechanism produces a problem in that as the motor is positioned on a lens barrel, for example, in a space between the body tube and the casing of the lens mounting, the outer appearance becomes awkward with a large outward projection only at that portion which contains the motor. Up to now, the portion comprising the lens barrel has been perfectly round over its entire length. Thus such an awkward appearance cause in users a feeling of discomfort. This is not only undesirable from the standpoint of industrial design but also because it involves an objectionably large increase in the complexity of the structure of the lens mounting mechanism.

Another prior art proposal involves the use of a linear motor in controlling the movement of the focusing lens as disclosed in U.S. patent application Ser. No. 396,030 filed July 7, 1982 (corresponding to Japanese Laid-Open Patent Application No. Sho 58-10706 published Jan. 21, 1983). In this case, however, the stator of the motor must be as elongated axially as much as the range of movement of the focusing lens, and the rigorous requirement for the control of adjustment in position of the focusing lens is also difficult to fulfill.

Another type of lens focus adjusting mechanism using an epicyclic motor is known in U.S. Pat. No. 4,152,060. This motor is constructed with a stator concentric to the optical axis of the focusing lens and a tubular armature arranged in eccentric relation to the optical axis upon energization to rotate epicyclically relative to the stator. A lens holder for the focusing lens has a central axis substantially coincident with the optical axis and is rotatably mounted in the interior of the armature through an intermediary of which the center of rotation is in coincidence with the optical axis and of which rotative motion causes axial movement of the lens holder. The mechanism further includes a drive connection for transmitting epicyclic motion of the armature to rotative motion of the lens holder. From this description it seems that the structure of a lens mounting adapted for use of such focusing mechanism will be very complicated and therefore the assembling and adjusting operations will be very difficult to carry out.

Since it is conventional for a lens mechanism to be called lens is round in crosssection, the parts of the lens mounting are designed on the basis of this form, and constituent parts such as the lens holder, fixed body, focusing actuator, zoom actuator, helicoid member and cam member are necessarily of a round shape. Therefore it has been sought to construct the motor usable with the operating mechanism for the focusing lens or zoom lens from only such tubular constituent parts as are compatible with the parts constituting the lens mounting with the advantage that the outer appearance will not have an awkward projection, and the use of the motor will not call for an unduly large increase in the complexity of the structure of the lens mounting mechanism. A device seeking to achieve this object is disclosed in Japanese Laid-Open Patent Application No. Sho 57-186738 published Nov. 17, 1982. This prior art device concerns a lens mounting provided with a space near a holder containing a lens group to be axially moved, wherein a motor is positioned in this space and is fixedly secured to the lens holder. When the motor is energized, the lens holder is driven along with this motor to move axially to effect focusing or zooming. A practical example of this motor is shown in an annular form.

It is also known to provide a stepping motor incorporated in a lens mounting wherein the movable lens is driven to move by the stepping motor as disclosed in Japanese Laid-Open Patent Application No. Sho 56-147132. This stepping motor is of the variable reluctance (VR) type and is arranged between the lens holder and the lens case. Rotative movement of the motor is converted to axial movement of the lens holder by a drive connection.

SUMMARY OF THE INVENTION

It is an object of the present invention to provide a mechanical mounting for a lens system having a focusing component or zoom components driven to move by a motor, while still permitting the motor to be built into the interior of the lens mounting without involving any unduly large increase in the bulk and size of the outer lens barrel and without causing deformation of the outer appearance.

Another object is to make use of a stepping motor as the drive source for the movable lens component together with a drive connection for converting motion of the rotor to axial movement of the lens holder which connection is formed in the rotor itself, thereby providing an advantage in that the number of parts is reduced, and that a further reduction in the thickness of the motor is achieved, thereby contributing to achievement of a minimum diameter for the outer lens barrel.

BRIEF DESCRIPTION OF THE DRAWINGS

FIG. 1 is a partly sectional and partly elevational view of a lens mounting. FIG. 2 is an exploded perspective view of a field yoke and a rotor. FIG. 3 is a fragmentary perspective view illustrating the details of the main parts of the motor and the drive connection. FIG. 4 is a block diagram of a control system for controlling the driving of the lens mounting.

FIG. 7 is a partly longitudinal section and partly elevational view of a lens mounting. FIG. 8 is an exploded perspective view of a field yoke and a magnet rotor.

DETAILED DESCRIPTION OF THE PREFERRED EMBODIMENTS

Figure 1:
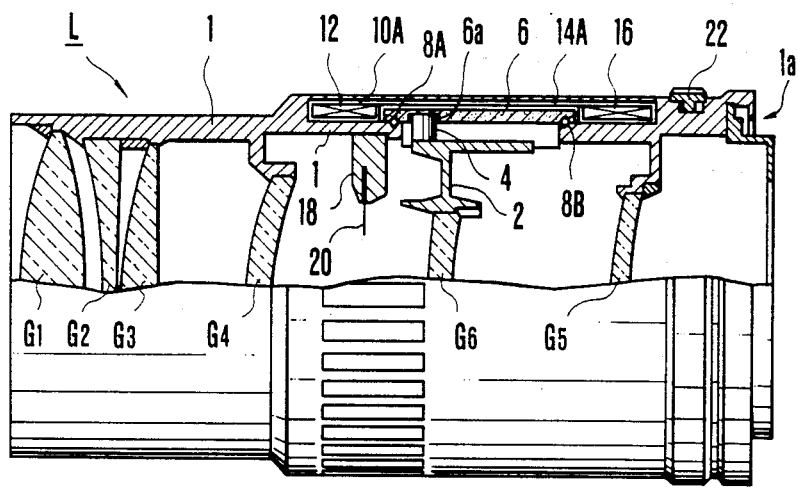
FIGS. 1 to 4 illustrate a first embodiment of the invention. Of these figures
Figure 3:
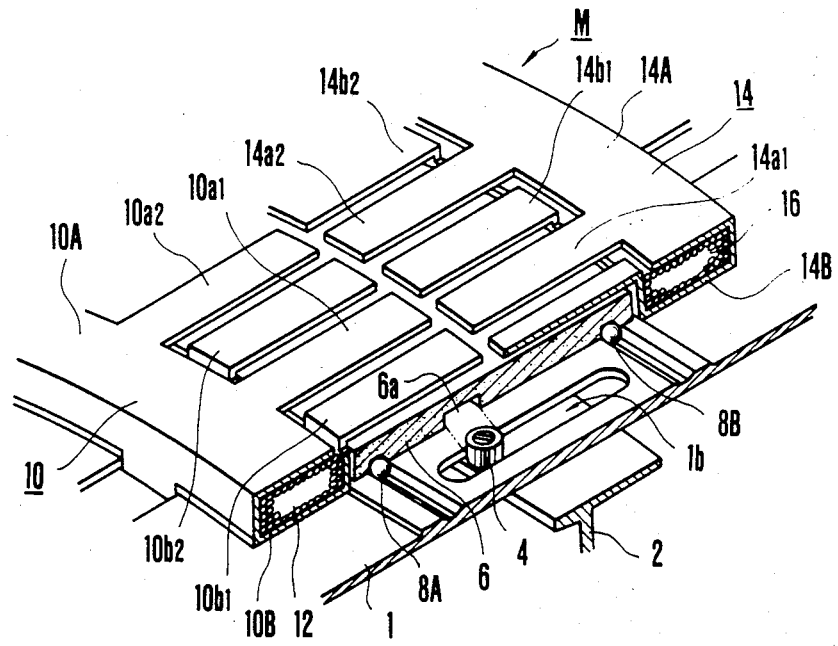
Figure 2:
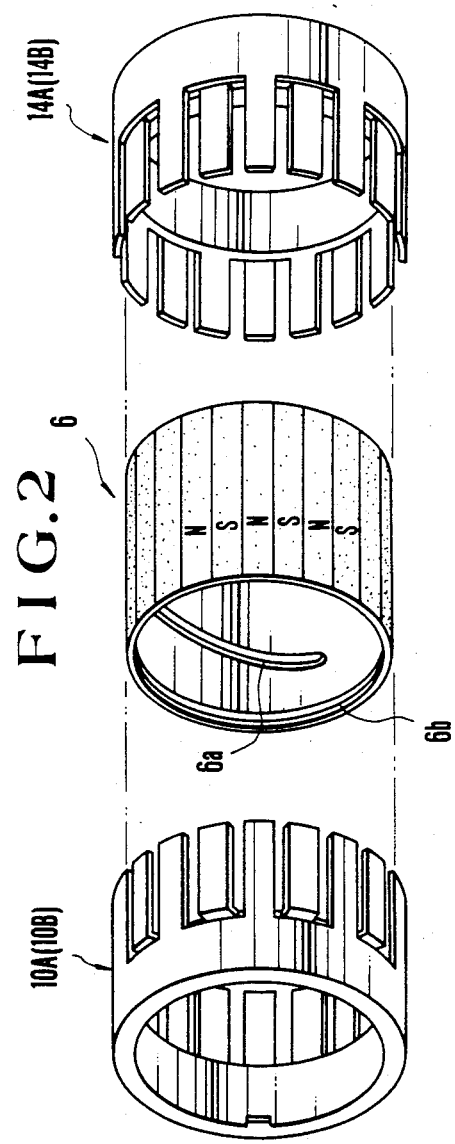

In FIGS. 1 to 3 there is shown a first embodiment of the invention where 1 denotes a body tube of a lens mounting L having a built-in motor. Lens elements G1 to G5 are fixedly mounted to the body tube 1. A bayonet coupling portion 1a is formed in the rear end of the body tube 1. A lens holder 2 containing a focusing lens element G6 is movably fitted in the inner diameter of the body tube 1. A drive connection pin 4 extends radially outwardly of the outer peripheral surface of the lens holder 2 through a longitudinal slot 1b formed through the wall of the body tube 1 into a camming groove 6a of a rotor 6. The rotor 6 is made of magneto-plastic material and is formed to a hollow cylindrical shape with N and S poles alternating about the optical axis as shown in FIG. 2. The camming groove 6a formed in the inner surface of the rotor 6 constitutes together with the drive connection pin 4, a mechanism for transmitting rotative movement of the rotor 6 into axial movement of the lens holder 2. Two circumferential grooves 6b for accommodating ball bearings 8A and 8B are formed in either end of the axial length of the inner surface of the rotor 6 with only one of the grooves 6b being visible in FIG. 2.

A first field yoke 10 holding a field coil 12 is constructed with two members 10A and 10B having letter L-shaped portions to enclose the coil 12 and having pole teeth 10a1, 10a2, ... and 10b1, 10b2, ... respectively extending rearwardly of the L-shaped portions to cover the front half of the rotor 6. The pole teeth 10a and 10b alternate each with the other. A second field yoke 14 holding a second field coil 16 is constructed with two members 14A and 14B in a similar form to that of the first field yoke 10. Their pole teeth 14a1, 14a2, ... and 14b1, 14b2, ... are displaced from those of the first field yoke 10 by a ½ pitch in the tangential direction.

The first and second field yokes 10 and 14 and the first and second field coils 12 and 16 constitute a stepping motor M.

It is desirable that the body tube 1 which lies inside the magnet rotor 6 be made of magnetic material with a view toward providing good permeability of magnetic flux and increase efficiency of the motor. In order to minimize the weight of the body tube 1, that portion of the body tube which lies near the rotor 6 is made of ferrous material, and the other portion may be made of aluminum alloy or plastic material.

A diaphragm 20 is housed in a case 18 fixedly mounted to the body tube 1, and has a presetting ring 22 operatively connected to a control ring for the diaphragm blades through a presetting mechanism of prior known construction (not shown).

In operating the lens mounting mechanism of such construction, with the lens components G1 to G6 constituting a photographic objective optical system, when motion of the motor is imparted into the component G6, automatic focus adjustment is formed. The reflected light from a target object is received by a range finder 24. The output signal representing the object distance from the range finder 24 is applied to a signal processor 26 where the number of steps through which the rotor 6 of the motor M must be rotated to move the focusing lens component into the in-focus position is computed. The output signal from the signal processor 26 is applied to a motor drive circuit 28, whereby the field coil 12 or 16 is supplied with current in the form of the required number of pulses. As the rotor 6 rotates, the lens holder 2 is moved axially by a distance depending upon the track of the camming groove 6a. The aforesaid range finder, signal processor and motor drive circuit may be of known design.

Responsive to the signal from the processor 26, the motor drive circuit 28 provides pulsated current to the first to fourth coils L1 to L4 of the field coil 12 or 16 successively. By this current, each of the pole teeth 10a1, 10a2, ..., 10b1, 10b2, ..., 14a1, 14a2, ... and 14b1, 14b2, ... generates an electromagnetic field and attracts or repels the magnetic poles of the rotor 6 so that the rotor 6 is driven to rotate about the axis of the body tube 1.

When the computed number of pulses by the signal processor 26 have been produced and the rotor 6 has rotated by the required angular distance, the focusing lens component G6 is stopped in an in-focus position after it has moved by a distance depending upon the shift of the camming groove.

This embodiment has an advantage that because the rotor 6 is formed to a hollow cylindrical shape so that it can be arranged on the body tube and also because the rotor 6 itself is made to serve as a control member for the movement of the focusing lens component G6 by forming therein the camming groove 6a, the radial thickness of the lens mounting can be reduced. The arrangement of the field coils and field yokes which constitute the stator of the motor M adjacent either end of the axial length of the rotor 6 and the limitation of what lies above the outer periphery of the rotor 6 only to the pole teeth 10a, 10b, ..., 14a and 14b ... also contribute to the valuable decrease in the diameter of the lens mounting.

Figure 5:
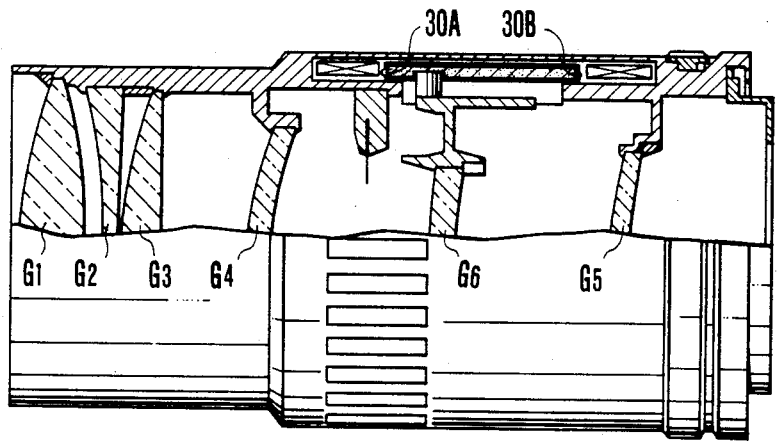
FIG. 5 and FIGS. 6(a) and 6(b) illustrate an example of improvement of the bearing for the rotor of the lens mounting of FIG. 1.
Figures 6A, 6B:
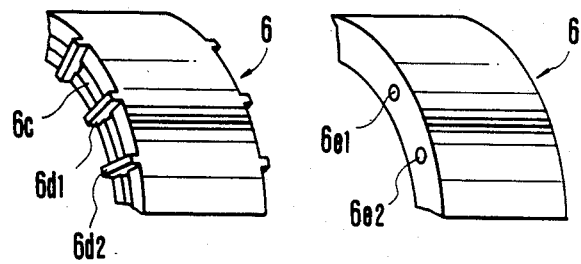

FIG. 5 and FIGS. 6(a) and 6(b) illustrate an example of variation of the above-described first embodiment, wherein the bearings for the rotor 6 are positioned between either of the field yokes and either end of the rotor 6 to achieve a further reduction of the radial thickness of the lens mounting. The lens mounting of FIG. 5 is similar in construction to that of FIG. 1 except for the positioning of the bearing portion of the rotor 6. Therefore, only the bearing portion will next be described.

As shown in FIG. 5, the rotor 6 is provided with ball bearings 30A and 30B at either end of the axial length thereof. In one example of FIG. 6(a), as each ball bearing has a number of balls, each ball is located in the one portion of a groove 6c in the end of the rotor 6 which is divided by successive radial projections 6d1, 6d2, .... Thus a range of movement of the ball is defined.

In another example of FIG. 6(b), a number of semi-spherical recesses 6e1, 6e2, ..., to corresponding the number of balls in the bearings 30A and 30B are formed in the end of the rotor 6 to accommodate the respective balls.

Figure 7:
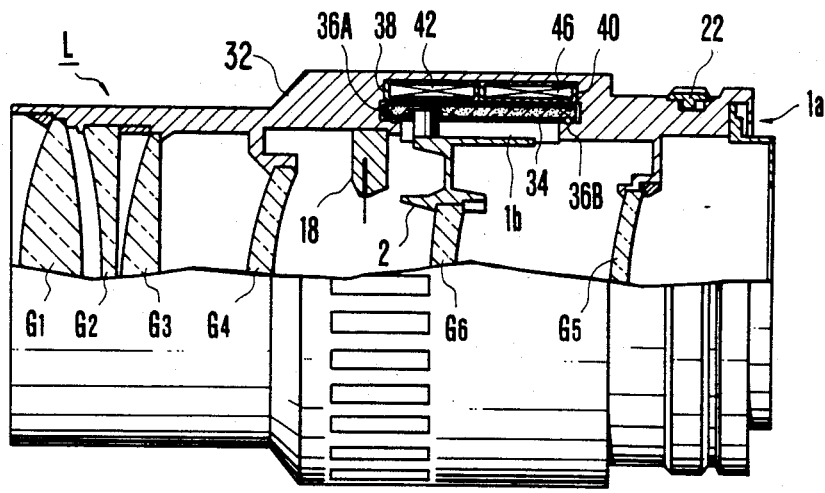
FIG. 7 and 8 illustrate a second embodiment of the invention. Of these figures
Figure 8:
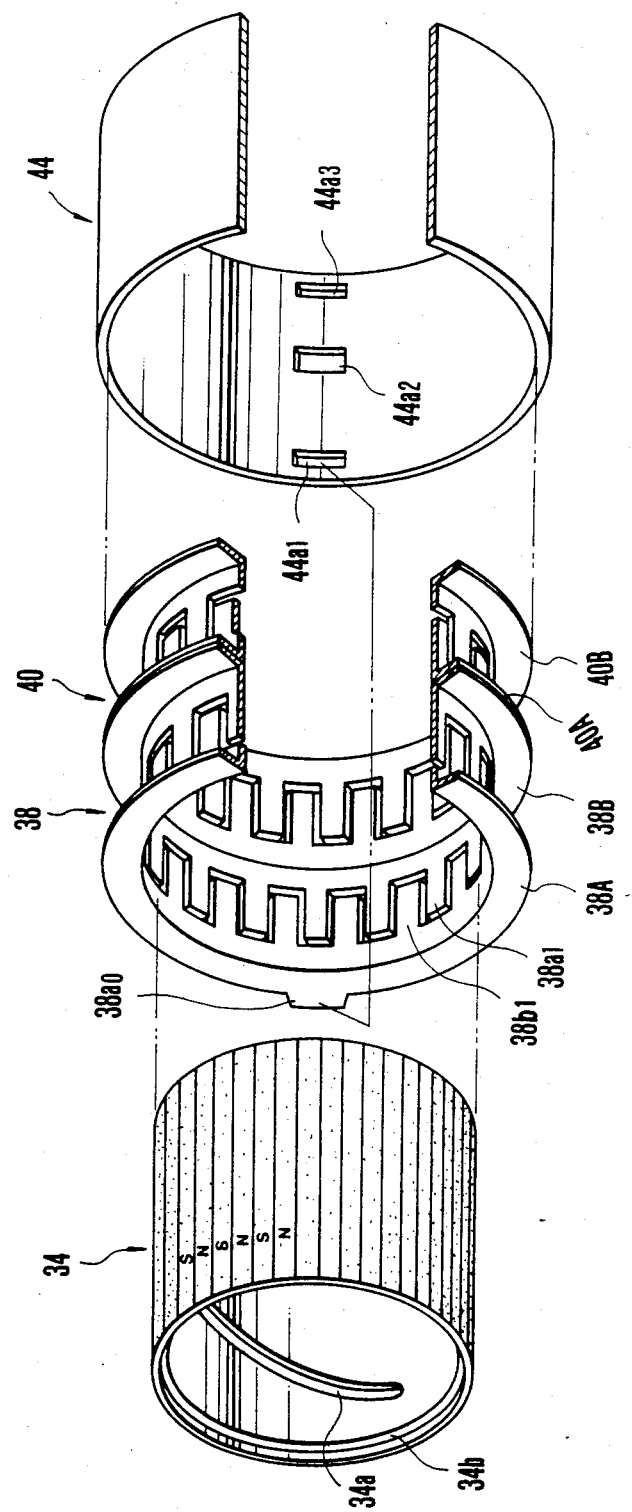

FIGS. 7 and 8 illustrate another embodiment of the invention, where a body tube 32 fixedly carries lens components G1 to G5. A hollow cylindrical magnet rotor 34 is made of magneto-plastic material and has N and S poles alternating with each other. Formed in the inner surface of the rotor 34 is a camming groove 34a for controlling the axial movement of the focusing lens component G6. The magnet rotor 34 is rotatably fitted on the outer diameter of the body tube 32 through a pair of ball bearings 36A and 36B.

A first field yoke 38 is constructed with two members 38A and 38B having radial flanges at the front and rear ends thereof respectively and axially elongated pole teeth $38a1, 38a2, \ldots$ and $38b1, 38b2, \ldots$ at the opposite ends thereof. These two members 38A and 38B are assembled so that there are provided pole teeth $38a_n$ and $38b_n$ where n is equal to 1, 2 or 3 which alternate with each other as shown in FIG. 8. A first field coil 42 is positioned in a space defined by the front and rear flanges and pole teeth of the yoke members 38A and 38B. A second field yoke 40 and a second field coil 46 are similar in construction and arrangement to the first ones.

The first and second field yokes 38 and 40 are arranged on the outer periphery of the magnet rotor 34, covered with an outer barrel yoke 44 of FIG. 8, and fixedly secured to the body tube 32.

The yoke members 38A, 38B, 40A and 40B each are provided with a radial extension $38a0, 38b0, 40a0, 40b0$ (not shown) on the outer periphery of the flange thereof, while the outer sleeve yoke 44 is provided with holes $44a1, 44a2$ and $44a3$ for engagement with the extensions to determine the relative position of the two members.

Figure 4:
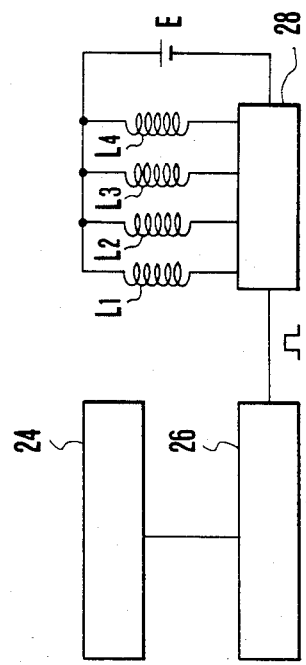

As the control system for the lens mounting of FIGS. 7 and 8 use may be made of that of FIG. 4. The pulsated signal from the drive circuit 28 is applied to the field coils 42 and 46 so that the rotor 34 rotates stepwise, thereby adjustment in axial position of the focusing lens G6 is automatically formed in a similar manner to that described in connection with the foregoing embodiment.

The lens mounting of FIGS. 7 and 8 has an advantage in the axial length of the coils 42 and 46 is increased with increase in the number of turns of the coils crossing the magnetic flux of the magnet rotor 34, whereby the number of layers of turns of the coils can be reduced and the driving torque can be increased.

Another advantage is that the radial thickness of the motor is limited to a minimum, thus facilitating a minimization of the bulk and size of the lens mounting.

While specific embodiments of the invention have been shown and described in detail to illustrate the application of the inventive principles, it will be understood that the invention may be embodied otherwise without departing from such principles.

What is claimed is:

1. A lens assembly comprising:
   (a) a body tube;
   (b) lens holder means containing focusing lens means defining an optical axis;
   (c) motor means for moving said lens holder means, said motor means including:
   a hollow cylindrical field magnet rotatable about said optical axis and having a camming groove for determining the amount of axial movement of said lens holder means, and
   a field coil and a field yoke for producing an electromagnetic force by which said field magnet is driven to rotate stepwise; and
   (d) a drive connection member on said lens holder menas and extending into a cross point of a longitudinally elongated slot provided in said body tube and said camming groove of said field magnet;
   (e) said field yoke including a first yoke member holding a first field coil and having pole teeth axially extending over the outer periphery of said field magnet, and a second yoke member positioned on the opposite side of said field magnet to said first yoke member, holding a second field coil and having pole teeth axially extending over the outer periphery of said field magnet in displaced relation to the pole teeth of said first yoke member by a predetermined pitch in a circle with its center at said optical axis.

2. A lens assembly comprising:
   (a) a body tube;
   (b) lens holder means containing focusing lens means defining an optical axis;
   (c) motor means for moving said lens holder means, said motor means including:
   a hollow cylindrical field magnet rotatable about said optical axis and having a camming groove for determining the amount of axial movement of said lens holder means, and
   a field coil and a field yoke for producing an electromagnetic force by which said field magnet is driven to rotate stepwise; and
   (d) a drive connection member on said lens holder means and extending into a cross point of a longitudinally elongated slot provided in said body tube and said camming groove of said field magnet;
   (e) said field yoke including first and second yoke members holding a first field coil, having respective pole teeth alternating with each other and being arranged concentrically outside said field magnet, and third and fourth yoke members holding a second field coil, having respective pole teeth alternating with each other and being arranged axially adjacent to said first and second yoke members.

3. A lens mounting according to claim 1 or 2, wherein said field magnet is a molded member made of magnetoplastic material and ball bearings are provided between said field magnet and said field yoke.

4. A lens mounting according to claim 3, wherein a guide groove for each of said ball bearings is formed in either end surface of the axial length of said field magnet.

5. A lens mounting according to claim 4, wherein said ball bearings comprise a plurality of balls and wherein said guide grooves formed in the end surfaces of said field magnet each are provided with dividing members for individually limiting the movement of each ball of said ball bearings.

6. A lens assembly having a motor built therein, comprising:
   (a) a movable lens and a lens holder containing said lens;
   (b) a body tube having a guide slot for guiding the movement of said lens holder;
   (c) a hollow cylindrical field magnet fitted on said body tube, said hollow cylindrical field magnet having a cam groove cooperative with said guide slot to move said lens holder;
   (d) field coils arranged adjacent either end of said hollow cylindrical field magnet in axial alignment therewith; and
   (e) yoke means comprising two yoke units each containing one of said field coils, each of said yoke units having two yoke members, said two yoke members in each unit having pole teeth of axial extension alternating with each other over the entire length of the outer periphery of said field magnet.

7. A lens assembly for moving a lens along an optical axis to effect an optical function, comprising:
   (a) a lens holder containing said lens;
   (b) a body tube having a guide slot for guiding said lens holder;
   (c) a hollow cylindrical field magnet fitted on said body tube, said hollow cylindrical field magnet having a cam groove cooperative with said guide slot to move said lens holder;
   (d) means rotatably supporting said hollow cylindrical field magnet, said supporting means comprising circumferential grooves formed in the confronting surfaces of said body tube and said hollow cylindrical field magnet in radial alignment to retain a bearing member;
   (e) field coils arranged adjacent either end of said hollow cylindrical field magnet in axial alignment therewith; and
   (f) yoke means comprising two yoke units each containing one of said field coils, each yoke unit having two yoke members, with said two yoke members in each unit having pole teeth alternatively arranged over the outer periphery of said hollow cylindrical field magnet.

8. A lens assembly comprising:
   (a) a lens capable of performing at least one of a focusing and zooming functions and a lens holder containing said lens;
   (b) a body tube containing said lens holder;
   (c) electromagnetic drive means driving said lens holder to effect axial movement thereof, said drive means having a hollow cylindrical field magnet including front and rear walls fitted on said body tube provided with a cam groove for connection with said lens holder and made of plastic magnet material, field coils positioned adjacent either side of said hollow cylindrical field magnet, and yoke means each containing one of said field coils and pole teeth extending over the outer periphery of said hollow cylindrical field magnet; and
   (d) means for rotatably supporting said hollow cylindrical field magnet, said supporting means comprising radial projections formed on each of said front and rear walls of said hollow cylindrical field magnet and arranged in contact with either of said yoke means, whereby when said pole teeth of said yoke means are magnetized by supplying current to said field coils, said hollow cylindrical field magnet rotates while being supported by said radial projections.

9. A lens assembly comprising:
   (a) a lens capable of performing at least one of a focusing and zooming functions and a lens holder containing said lens;
   (b) a body tube containing said lens holder;
   (c) electromagnetic drive means driving said lens holder to effect axial movement thereof, said drive means having a hollow cylindrical field magnet fitted on said body tube provided with a cam groove for connection with said lens holder and made of plastic magnet material, field coils positioned adjacent either side of said hollow cylindrical field magnet, and yoke means each containing one of said field coils and pole teeth extending over the outer periphery of said hollow cylindrical field magnet; and
   (d) means for rotatably supporting said hollow cylindrical field magnet, said supporting means comprising spherical recesses formed in either one of the confronting surfaces of said hollow cylindrical field magnet and said yoke means, and balls held in said spherical recesses, whereby when said pole teeth of the yoke means are magnetized by supplying current to said field coils, said hollow cylindrical field magnet rotates while being supported by said balls.

* * * * *